UNITED STATES PATENT OFFICE.

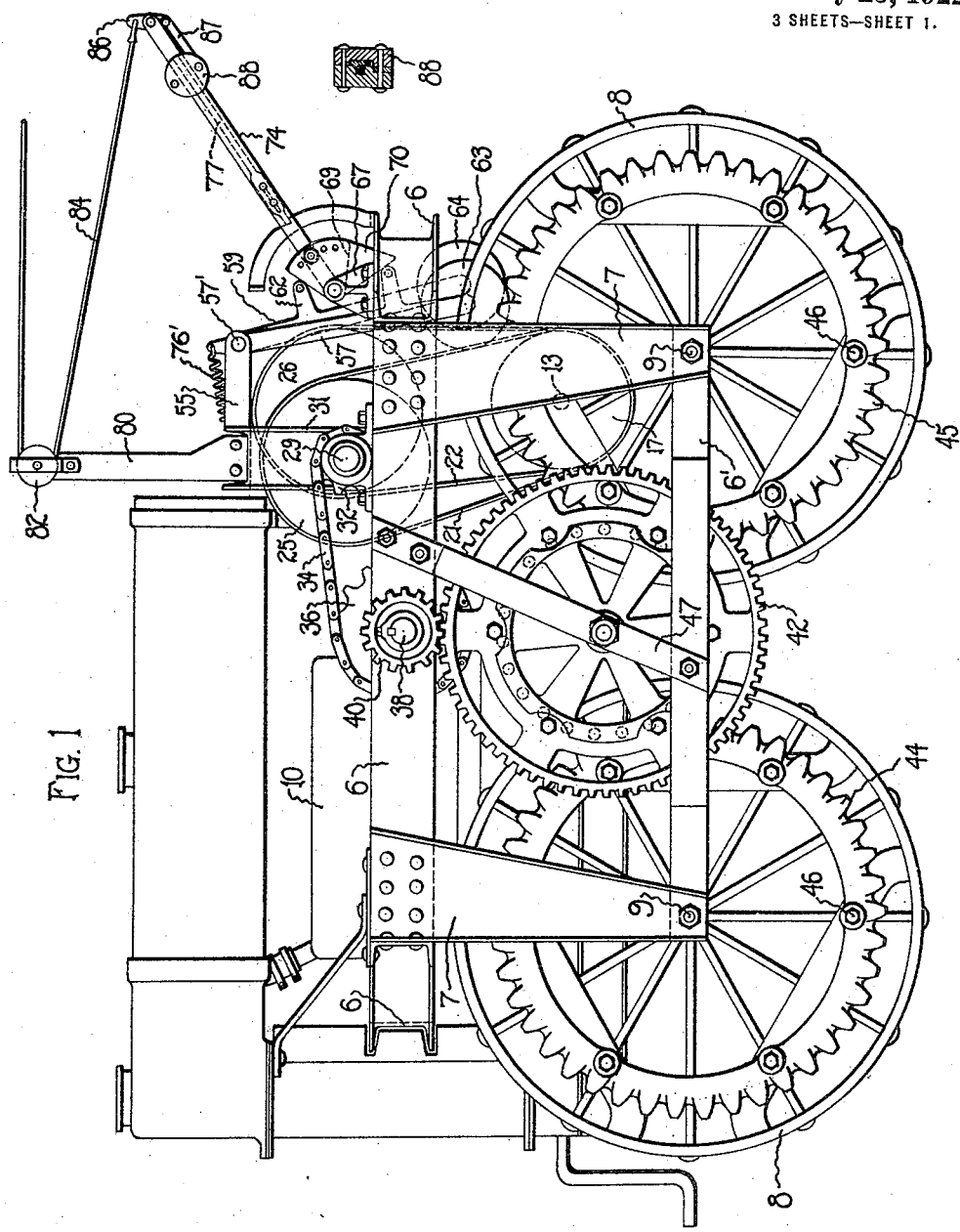

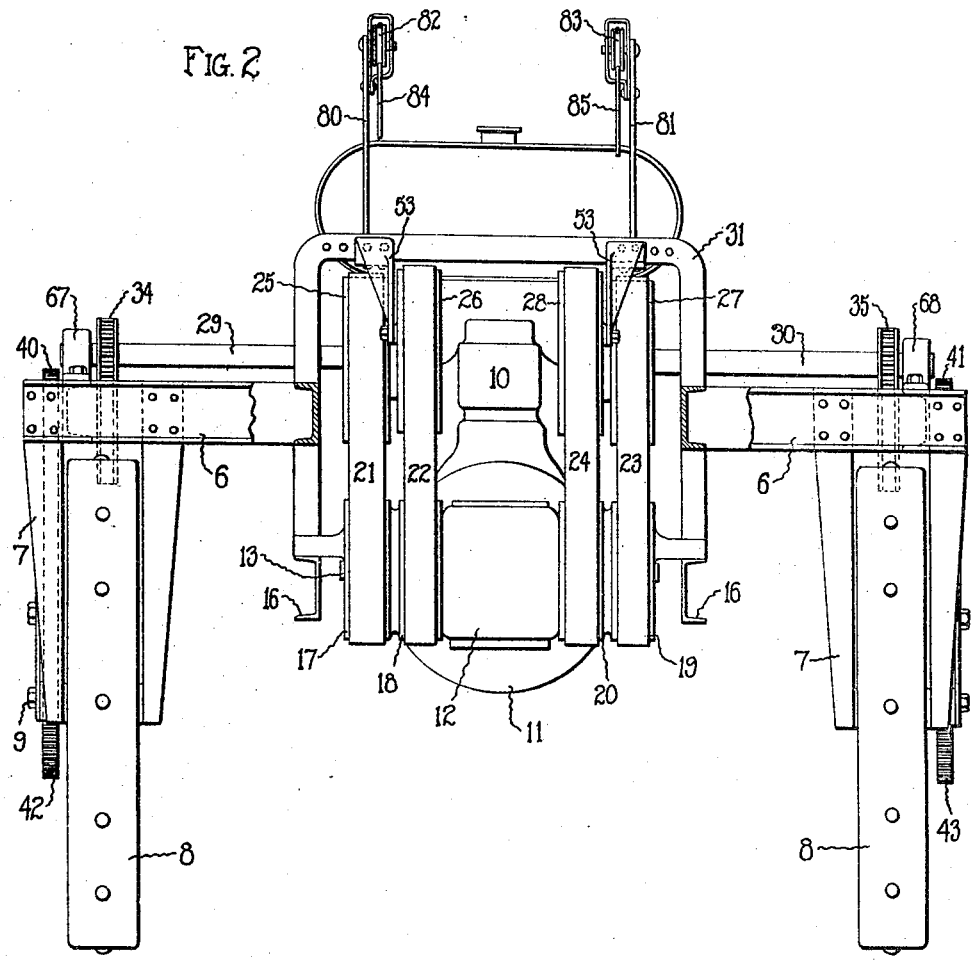

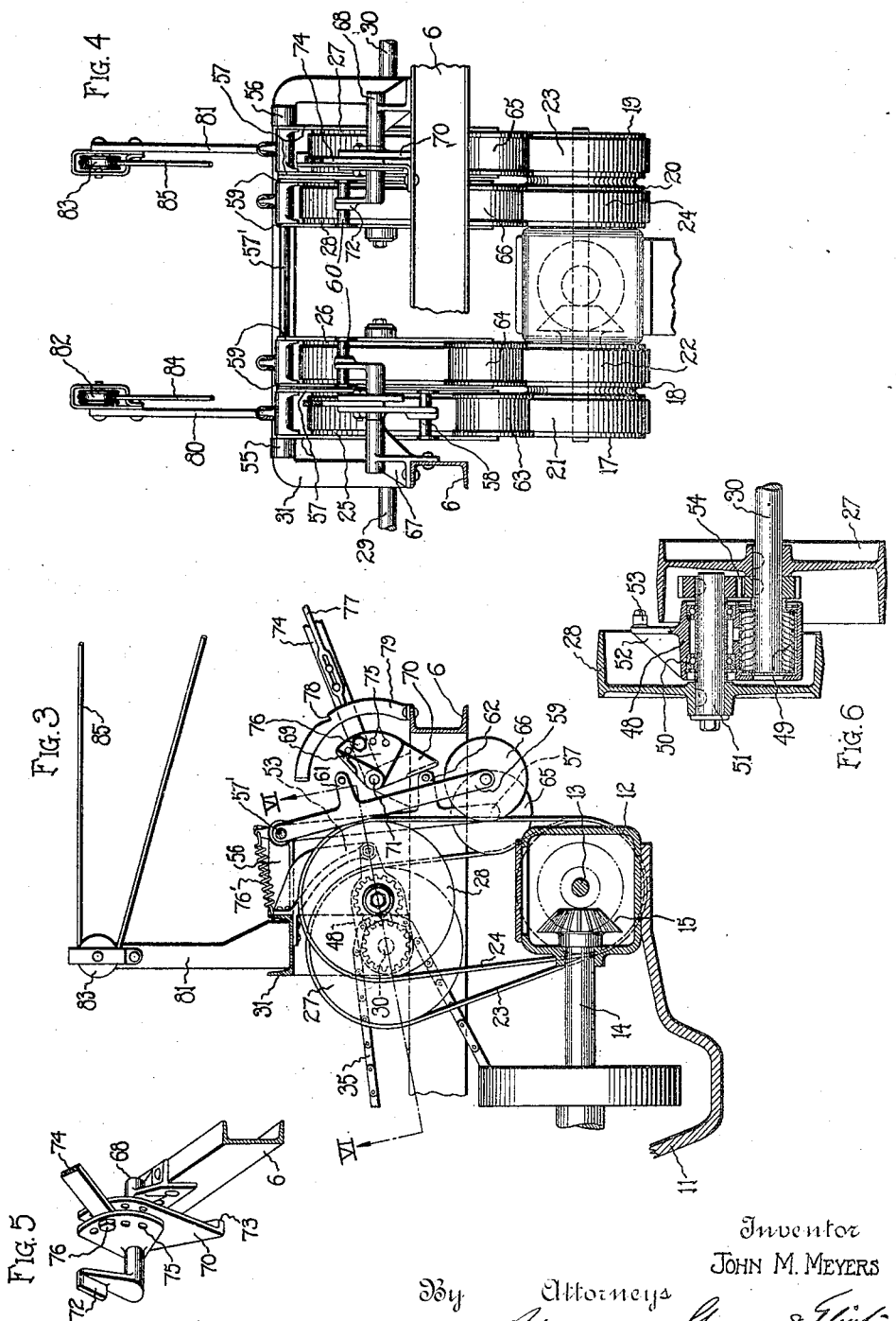

JOHN M. MEYERS, OF JANESVILLE, WISCONSIN, ASSIGNOR TO GENERAL MOTORS CORPORATION, OF DETROIT, MICHIGAN, A CORPORATION OF DELAWARE.

TRACTOR.

1,417,193. Specification of Letters Patent. Patented May 23, 1922.

Application filed November 26, 1919. Serial No. 340,715.

*To all whom it may concern:*

Be it known that I, JOHN M. MEYERS, a citizen of the United States, and a resident of Janesville, county of Rock and State of Wisconsin, have invented certain new and useful Improvements in Tractors, of which the following is a full, clear, concise, and exact description, such as will enable others skilled in the art to which the invention relates to make and use the same, reference being made therein to the accompanying drawings, which form a part of this specification.

My invention relates to farm tractors designed for general agricultural purposes, and particularly to tractors of the general class or type commonly referred to as "line drive" tractors, and in which the movements of the tractor are controlled by flexible members or lines connected therewith, and which are handled by the operator of the machine, thus permitting the operator to ride upon the agricultural or other implement drawn by the tractor, and to control the same from the seat without, however, actually riding upon the tractor itself. It may be here remarked, however, that the tractor may be provided with a seat should it be deemed desirable to do so, and that the same may be controlled by the person riding upon the tractor itself.

The principal object of my invention is to provide a tractor of the general type or class referred to, which will be available for hauling purposes, and which may be conveniently hitched to common and ordinary forms of agricultural implements to draw the same, the tractor being provided with improved transmission mechanism whereby its movements may be more readily controlled than has heretofore commonly been the case.

A further object of my invention is to provide an improved farm tractor having four driving wheels arranged in pairs on opposite sides of the tractor, and in which an improved form of transmission mechanism is provided for driving each pair of wheels independently of the other pair and in either a forward or a reverse direction, to thereby provide a tractor the movement of which and the turning about of which may be more readily controlled than has heretofore commonly been the case.

A further object of my invention is to provide a farm tractor in which the frame which supports the operating elements of the tractor is a single rigid structure, thereby providing a tractor which will be found to have a greater draw-bar pull as compared with the total weight thereof than is secured in cases where the driving wheels of the tractor are spring supported relative to the frame thereof.

A further object of my invention is to provide an improved farm tractor having pairs of driving wheels located upon opposite sides thereof, and in which the driving of each pair is accomplished by improved transmission mechanism provided for that end.

An additional and primary object is to provide a tractor having both a high clearance and a low center of gravity. This I secure by suspending or supporting the engine centrally of the tractor and with its crank shaft below the tops of the wheels and by driving the wheels therefrom by connections that rise from the engine, then extend laterally, and finally come down to driving relation to the wheels, the precise nature of these connections being subject to wide modifications. Again, I preferably omit direct connections between the lower portions of the engine structure and the corresponding side portions of the tractor frame adjacent the wheel axles in the general construction stated and thereby form two longitudinally extending channels in the lower side of the tractor adapted to straddle corresponding rows of corn or the like of a height substantially equal to or greater than that of the wheels. The tractor thus formed is well adapted for cultivating purposes both on side hills and level ground.

With the above and other objects of invention in view, my invention consists in the improved farm tractor and subsidiary parts and auxiliary features thereof illustrated in the accompanying drawings and hereinafter described and claimed, and in such variations and modifications thereof within the scope of the concluding claims as will be obvious to those skilled in the art to which my invention relates.

Referring now to the drawings, wherein the preferred embodiment of my invention is illustrated:

Figure 1 is a view showing my improved farm tractor in side elevation.

Figure 2 is a view showing the same in end elevation and as seen from a position to the right of Figure 1, the belt tightener means employed, however, being omitted.

Figure 3 is a fragmentary view for the most part in side elevation showing the belt tightening means of the transmission mechanism employed.

Figure 4 is a view showing the mechanism shown in Figure 3 in end elevation, and as seen from a position to the right of Figure 1.

Figure 5 is a view showing a detail of the operating means associated with the belt tighteners.

Figure 6 is a view showing a section upon an inclined plane indicated by the line VI—VI, Figure 3.

In the drawings, the reference numeral 6 designates the main frame of my improved tractor, from which all the operating parts thereof are supported, and which frame is provided with depending legs 7, the upper ends of which are rigidly secured to the horizontally disposed frame structures 6 as by means of rivets as shown.

Two of these depending legs are provided for each of the four wheels designated by the reference numerals 8 with which the tractor is provided; the legs associated with each wheel being disposed one upon each side thereof as shown in Figure 2, the wheels being supported by short axles 9, one for each wheel, the ends of which are in turn supported adjacent the lower ends of the said legs, as will be understood from Figures 1 and 2 of the drawings.

The horizontally disposed frame 6 and the depending legs 7 thereof thus form a single unitary frame structure whereby all the parts of the tractor are supported; and the various parts of which frame are immovable relative to one another, thus providing a much stronger and stiffer frame structure than has heretofore been the case in tractors in which the frame itself has commonly been made up of various parts movable to a greater or less extent relative one to the other.

My improved tractor is operable by a suitable internal combustion engine which may be of any appropriate form, the same being indicated by the reference numeral 10. This engine is supported from the upper portion 6 of the frame at the middle thereof as shown in Figure 2, so that spaces are provided between the engine and the driving wheels of the tractor, thus providing a tractor in which the horizontal frame portion is elevated well above the ground, so that the tractor may be used for cultivating growing corn or other crops without injury thereto.

The crank case 11 of the engine 10 is extended to form a support for a housing 12 having bearings for a transversely extending main shaft 13 which is driven from the crank shaft or an extension 14 thereof of the engine through bevel gears 15. Any suitable means may be provided for supporting the engine from the frame of the vehicle such, for example, as channel bars shown at 16, said bars being supported from the frame of the tractor in any way, as will be understood.

The main shaft 13 is provided with two driving pulleys 17, 18 at one end thereof, and with two similar driving pulleys 19, 20 at the other end thereof, which pulleys serve to drive the driving wheels of the tractor adjacent which they are located, or upon the side of the tractor upon which they are located, through two pairs of driving belts 21, 22 and 23, 24, the belts 21 and 23 being the belts which are normally used to operate the tractor in a forward direction, while the belts 22 and 24 are ordinarily used to operate the same in a reverse direction.

The driving belts above referred to pass about the driving pulleys 17, 18, 19 and 20, and also about driven pulleys 25, 26, 27 and 28, and said belts are normally loose upon the pulleys, so that motion will be communicated from one pulley to the other in each instance only upon the tightening of the particular belt associated with the pulleys in question.

The driving pulleys 25 and 27 are secured to the inner ends of two driving shafts 29, 30 located above the horizontal portion 6 of the frame and extending to the sides thereof, said driving shafts being supported in suitable bearings provided in the side portions of the frame and in an upwardly extending U-shaped yoke 31, and the outer ends of these driving shafts are provided with sprocket wheels 32, 33, which drive two sprocket chains 34, 35 arranged one adjacent each of the pairs of driving wheels at the sides of the tractor; these sprocket chains in turn engage and drive two sprocket gears 36, 37 arranged centrally of the upper portion of the frame, said sprocket wheels being supported by short shafts 38 shown in Figure 1, and 39 corresponding with it upon the other side of the tractor, said shafts being supported in suitable bearings provided in the horizontal portion of the frame.

The shafts 38, 39 are provided with pinions 40 and 41, which pinions are in engagement with large driving gears 42, 43 located one at each side of the tractor, and which gears are provided with lantern gears the pins of which are indicated in dotted lines in Figure 1, which lantern gears engage the teeth of two annular gears 44, 45 detachably secured to the spokes of the driving wheels 8 of the tractor by means of suitable bolts 46.

The driving gears 42, 43 are supported from the main frame of the tractor in any way as, for example, by means of the diagonal bars, one of which is shown at 47 in Figure 1, and from which axles about which the said gears rotate are supported. The lower end of the bars 47 are secured to the bars 6' extending between the lower ends of the legs 7, as shown in Figure 1.

Associated with the driven pulleys 25, 26, 27 and 28 are bearing members the construction of which is shown in section in Figure 6, and which members are alike upon both sides of the tractor. This bearing member is indicated as a whole by the reference numeral 48, and the same is provided with a bearing 49 into which the inner end of the driving shaft 30 extends, and with a second bearing 50 which supports a short shaft 51, which carries the driven pulley 28.

The bearing member is provided with an arm or bracket 52 to which the lower and forward end of a bracket 53 extending from the U-shaped yoke 31 is connected, one such bracket 53 being provided for supporting the inner portion of each bearing member, and the purposes of said brackets being to prevent the said bearing members from rotating about the driving shafts 29, 30.

The driving shaft 30 and the shaft 51 are provided with intermeshing gear teeth designated by the reference numeral 54, whereby it will be appreciated that said driven pulleys rotate in opposite directions. It will therefore be appreciated that if, for example, the reverse drive belt 24 is acting to drive the pulley 28, then motion will be communicated through the gears 54 to the driving shaft 30 and to the pair of driving wheels which it operates in a manner to drive the tractor in a reverse direction, the belt 23 then being loose upon the pulley 27; whereas if the forward driving belt 23 is acting to operate the pulley 27, then motion will be communicated direct to the driving shaft 30 and to the pair of driving wheels which it operates in a direction to drive the tractor forward, the belt 24 running loose upon the pulley 28 in this last assumed case.

It will be appreciated that similar language applies to the transmission mechanism at the left-hand side of Figure 1 and made up of the pairs of driving and driven pulleys, and that the driver pulleys may, by proper manipulation of the belt tightening devices to be next described, secure forward driving of the pairs of driving wheels upon each side of the tractor, reverse driving of the driving wheels upon both sides of the tractor, forward driving of the driving wheels upon either side of the tractor and reverse driving of the driving wheels upon the other side of the tractor, or either forward or reverse driving of the driving wheels upon either side of the tractor, the belts being permitted to run loose upon the pairs of driving wheels upon the other side of the tractor in this last mentioned case.

This universality of control of the transmission mechanisms through which the pairs of driving wheels upon each side of the tractor are driven independently of one another, and either in a forward or in a reverse direction, provides a tractor which may be readily manoeuvred and turned about within an exceedingly small space, as will be appreciated.

It will also be appreciated that if all the belts run loose upon their respective pulleys, then and in that event no motion will be communicated to the driving shaft 29, 30 and to the driving wheels of the tractor, thus permitting the engine to run while the tractor remains at rest.

The construction and arrangement of the belt tightening devices for controlling the belts 21, 22, 23 and 24 above referred to is as follows:

Extending rearwardly from the yoke 31 and located one adjacent each end thereof are two arms or brackets 55, 56 having bearings at their free ends within which a transversely extending rod 57' is secured, and upon which rod two belt tightening devices associated with the transmission mechanism at the left of the tractor are supported, while two other belt tightening members, identical in construction with the two first referred to, are supported upon said rod at the right-hand end thereof, as best shown in Figure 4.

Each of the belt tightening devices above referred to comprises two parallel side members both of which are designated by the reference numeral 57, this reference numeral being applied to the side members of the belt tighteners which cooperate with the belts 21 and 23, as said side members are all alike. These side members are connected with one another by bearing pins 58 one only of which, however, is shown in Figure 4, as the other is hidden by a portion of the frame.

The side members of the belt tighteners associated with the belts 22 and 24 are designated all by the reference numeral 59, as they are all alike, and these last mentioned side members are connected with one another through bearing pins 60. The pins 58 and 60 are carried in the ends of laterally projecting arms extending from the several side members, the arms of the side members 59 being designated by the reference numeral 61, while those of the side members 57 are designated by the reference numeral 62.

Each of the pairs of side members 57, 59 above referred to serve as a support for tightening pulleys 63 and 64 belonging to the transmission mechanism at the left-hand side of the tractor and cooperating respectively with the belts 21 and 22, while the side members 57 and 59 associated with the transmission mechanism at the right-hand side of the tractor support belt tightening pulleys 65, 66 which cooperate with the belts 23, 24, the several tightening pulleys above referred to being rotatable upon shafts extending between the free lower ends of the said side members, as best shown in Figure 3 of the drawings.

Supported from the frame 6 of the tractor as by means of brackets 67, 68, one associated with each transmission mechanism, are two mechanisms for operating the belt tightening devices above described, in order to tighten one or the other of the belts with which they cooperate.

These belt tightening devices, one only of which will be described in detail as both are alike, are made up of two oscillating members 69, 70 both of which swing about a pivotal support carried by the bracket 68, and the position of which is indicated by the reference numeral 71. These members are provided with cam portions 72, 73 adapted respectively to engage the pins 60 and 58 of the belt tightening devices upon the right-hand side of the tractor, the right-hand tightener operating device being here referred to, to thereby swing one or the other of said belt tightening devices about the rod 57' as a pivotal support, and accomplishing the tightening of one or the other of the belts 23, 24.

Arranged between the segmental operating members 69, 70 is an operating lever 74, said levers swinging about the common pivot pin 71 of the said tightener operating members. The said members 69 and 70 are provided each with a series of holes 75, and the lever 74 is also provided with a hole adapted to register with these holes, and a bolt 76 extends through the holes in the tightener operating members and in the lever to thereby secure all of said parts together so that both the members 69 and 70 will move in unison as the lever 74 is moved.

It will be appreciated that as movement is imparted to the lever 74, say in an upward direction, the operating cam portion 72 of the member 69 will engage the pin 60 and bring about the tightening of the belt 24, while downward movement imparted to said lever will move the operating portion 73 of the member 70 into engagement with the pin 58 and tighten the belt 23.

The holes 75 are provided for adjusting the belt tightening members 69, 70 relative to one another to thereby vary the movement imparted to the belt tightening members by a given angular movement of the lever 74 from its neutral central position.

The several belt tightening members above referred to are acted upon by springs 76', one associated with each member, in order to keep the belt tightening pulleys 63, 64, 65 and 66 normally out of contact with the belts with which they cooperate. The lever 74 is provided with a longitudinally movable latch member 77, the end of which contacts with a shoulder 78 provided in a segment 79 which is supported from the frame 6 of the tractor when the said lever is in its neutral central position, and when the lever is in this central position all the belt tightening devices occupy positions away from the belts with which they cooperate, and all the belts run loose upon their respective pulleys.

Upon withdrawing the end of the bar 77 from the shoulder 78 the lever 74 may be moved downward to bring about the tightening of the forward driving belt 23 as above explained, and said lever may be readily moved upward during which the latch member 77 slides up and onto the segment 79 to thereby bring about the tightening of the reverse driving belt 24.

Extending upward from the yoke 31 are two standards 80, 81, which standards support pulleys 82, 83 at their upper ends, and the reference numerals 84, 85 designate flexible driving members or lines, which extend about said pulleys and the free ends of which are connected with releasing members pivotally supported at the free ends of each of the levers 74, one of which members is shown as 86 in Figure 1.

This member 86 is pivotally connected with a link 87 which, in turn, is connected with the weight 88 slidable along the lever 74, and this weight, in turn, is operatively connected with the upper end of the latch member 77. It will, therefore, be understood that if the flexible member or line 84 be pulled by the operator the lever 74 may be swung upwardly, thus operating the belt tightening device associated with the transmission mechanism upon the left-hand side of the tractor, and tightening the reverse driving belt 22, the lever shown in Figure 1 being of course the lever which is upon the left-hand side of the tractor.

If on the other hand the operator gives an easy pull to the line 84, and then slightly releases the same, the lower end of the latch member 77 will be withdrawn from the shoulder 78 for an instant, after which as the pull upon the line 84 is not maintained the weight 88 will swing the lever 74 downward, thus operating the belt tightening device which cooperates with the forward driving belt 21.

The operator may thus by proper manipulation of one or the other of the lines 84, 85 secure forward or reverse driving as to each of the transmission mechanisms, and may of course leave both transmission mechanisms in a neutral position by pulling the levers 74 into a higher position than they are shown in Figure 1, and then releasing the lines to permit the levers to return, during which the free lower end of the latch member 74 will move into contact with the shoulder 78.

Having thus described and explained my invention, I claim and desire to secure by Letters Patent:

1. In a tractor, two driving wheels located on opposite sides thereof, a cross frame extending across the tractor from side to side and forming in its lower surface a pair of unobstructed channels extending longitudinally of the tractor and up substantially to the level of the tops of the wheels, an engine suspended by the cross frame and having its crank shaft located well below the tops of the wheels, and means for driving the wheels from the engine.

2. In a tractor, two driving wheels located on opposite sides thereof, a cross frame connecting said wheels and forming in its lower sides unobstructed channels extending longitudinally of the tractor and above the level of the centers of the wheels, a propelling engine slung from said frame with its center of gravity below the tops of said wheels, and means for driving the wheels from the engine.

3. In a tractor, two pairs of driving wheels located on opposite sides thereof, a frame extending across the tractor from side to side at or above the tops of said wheels and including depending posts supported by said wheels, a sub-frame depending from said frame, an engine supported on the lower portion of said sub-frame, and means for driving said wheels from the engine, said means including shafting extending across toward the middle of the tractor from the outer side portions thereof at a level above the lower surface of the first mentioned frame.

4. In a tractor, two driving wheels located on opposite sides thereof, a frame extending across the tractor from side to side, an engine supported by the frame with its crank shaft considerably below the tops of the wheels, connections for driving said wheels from said crank shaft, said connections extending upwardly, then outwardly along the frame, and then downwardly to the corresponding wheels.

5. In a tractor, two driving wheels one located on either side thereof, a cross-frame having end posts embracing the corresponding wheels and supported thereby, a propelling engine slung from said cross-frame along the longitudinal central plane of the tractor, and wheel driving mechanisms separate from one another and each extending upwardly from the corresponding side of the engine, then outwardly along the frame and then downwardly into driving relation with the corresponding wheel.

6. A tractor including four supporting wheels located two on each side, a cross frame forming a connection between said wheels above the tops thereof, there being no connection between the wheels on opposite sides of the tractor below the cross-frame, a propelling engine slung from said cross frame with its center of gravity disposed below the tops of said wheels, and means for driving the wheels on opposite sides of the tractor from said engine independently of each other both forwardly and rearwardly.

7. In a tractor, four supporting wheels located two on each side, a cross-frame extending over the tops of said wheels and including depending legs for supporting it from the wheels, a sub-frame suspended from the cross frame, an engine supported by the sub-frame with its crank case considerably below the upper ends of said legs, and means driven by the engine having driving connection with the wheels, said driving connection extending across between the engine and the planes of said wheels above the level of the tops of the latter.

8. In a tractor, two driving wheels located one on each side of the tractor, a cross frame forming a connection between said wheels, an engine mounted below said frame, and means for driving said wheels from said engine, said parts being so arranged as to provide unobstructed channels longitudinally of the tractor between the engine and wheels extending above the level of the centers of said wheels.

9. In a tractor, two driving wheels located one on each side of the tractor, a cross frame connecting said wheels, an engine slung from said frame with its center of gravity below the tops of said wheels, and means for driving said wheels from said engine, said parts being so constructed and arranged as to leave unobstructed channels longitudinally of the tractor between the engine and wheels extending above the level of the centers of said wheels.

In testimony whereof I affix my signature.

JOHN M. MEYERS.